United States Patent [19]
Hitt

[11] Patent Number: 4,623,286
[45] Date of Patent: Nov. 18, 1986

[54] BORING BAR AND MEASURING DEVICE THEREFOR

[76] Inventor: Dale Hitt, 20850 Westhaven, Southfield, Mich. 48075

[21] Appl. No.: 753,361

[22] Filed: Jul. 8, 1985

Related U.S. Application Data

[63] Continuation of Ser. No. 469,293, Feb. 24, 1983, abandoned.

[51] Int. Cl.⁴ ............................................. B23B 25/06
[52] U.S. Cl. .................................... 408/116; 33/185 R; 408/241 R; 409/218
[58] Field of Search ..................... 408/241 R, 16, 116; 33/185 R; 409/63, 218; 33/180 R, 181 R, 172 R, 167

[56] References Cited

U.S. PATENT DOCUMENTS

| | | | |
|---|---|---|---|
| 1,284,456 | 11/1918 | Richards et al. | 408/103 |
| 1,416,810 | 5/1922 | Foster | 33/185 R |
| 1,421,073 | 6/1922 | Furness et al. | 33/185 R |
| 1,444,080 | 2/1923 | Nyman | 33/172 R |
| 1,887,437 | 11/1932 | Schotthoefer | 33/185 R |
| 1,988,378 | 1/1935 | Dunn | 408/116 |
| 2,000,476 | 5/1935 | Schmidt | 33/189 R |
| 2,043,613 | 6/1936 | Hane | 33/185 R |
| 2,107,558 | 2/1938 | Zimmerman | 33/185 R |
| 2,156,500 | 5/1939 | Jeschor | 33/185 R |
| 2,310,992 | 2/1943 | Proska | |
| 2,341,466 | 2/1944 | Nardi | 33/185 R |
| 2,348,530 | 5/1944 | Droitcour et al. | 33/185 R |
| 2,375,448 | 5/1945 | Talbot et al. | 33/185 R |
| 2,441,716 | 5/1948 | Mitchell | 33/185 R |
| 2,556,067 | 6/1951 | Coffer | 33/185 R |
| 2,657,470 | 11/1953 | Allen et al. | 33/185 R |
| 2,730,810 | 1/1956 | Broden | 33/185 R |
| 2,872,736 | 2/1959 | Abbott | 33/172 |
| 2,886,896 | 5/1959 | Humphreville | 33/185 R |
| 2,891,317 | 6/1959 | Wood | 33/185 R |
| 3,050,862 | 9/1962 | Koch | 33/185 R |
| 3,069,781 | 12/1962 | Klaiban | 408/116 X |
| 3,135,056 | 6/1964 | Sleeter | 33/185 R |
| 3,167,868 | 2/1965 | Arneson | 33/185 R |
| 3,273,253 | 9/1966 | Eigenbrode | 33/185 R |
| 3,323,221 | 6/1967 | Koch | 33/185 R |
| 3,380,321 | 4/1968 | Schaffler | 408/16 |
| 3,636,636 | 1/1972 | Baldyga | 33/185 R |
| 3,781,999 | 1/1974 | Colangelo | 33/185 R |
| 3,838,521 | 10/1974 | Peterson | 33/185 R |
| 4,433,488 | 2/1984 | Baumgartner | 33/185 R |

FOREIGN PATENT DOCUMENTS

| 725006 | 9/1942 | Fed. Rep. of Germany | 33/185 |
| 2533531 | 2/1977 | Fed. Rep. of Germany | 408/241 R |

OTHER PUBLICATIONS

Starret, "Precision Tools Catalog", 1979, p. 9.

Primary Examiner—Gil Weidenfeld
Assistant Examiner—Glenn L. Webb
Attorney, Agent, or Firm—Harness, Dickey & Pierce

[57] ABSTRACT

A boring bar and associated measuring gage device, according to the invention, includes a gaging surface on the measuring gage device that is engagable with a gaging surface on the boring bar. By such engagement, a measuring surface on the measuring gage device remains perpendicular to a reference plane defined by the cutting tip of the boring bar's cutting tool and the rotational center line of the boring bar, thereby substantially assuring accurate measuring, gaging, or positioning of the radial position of the cutting tip. Preferably, attachment means are provided for releasably fixing the measuring means to the boring bar in order to maintain such engagement of the gaging surfaces during such measuring, gaging or positioning of the cutting tool.

9 Claims, 4 Drawing Figures

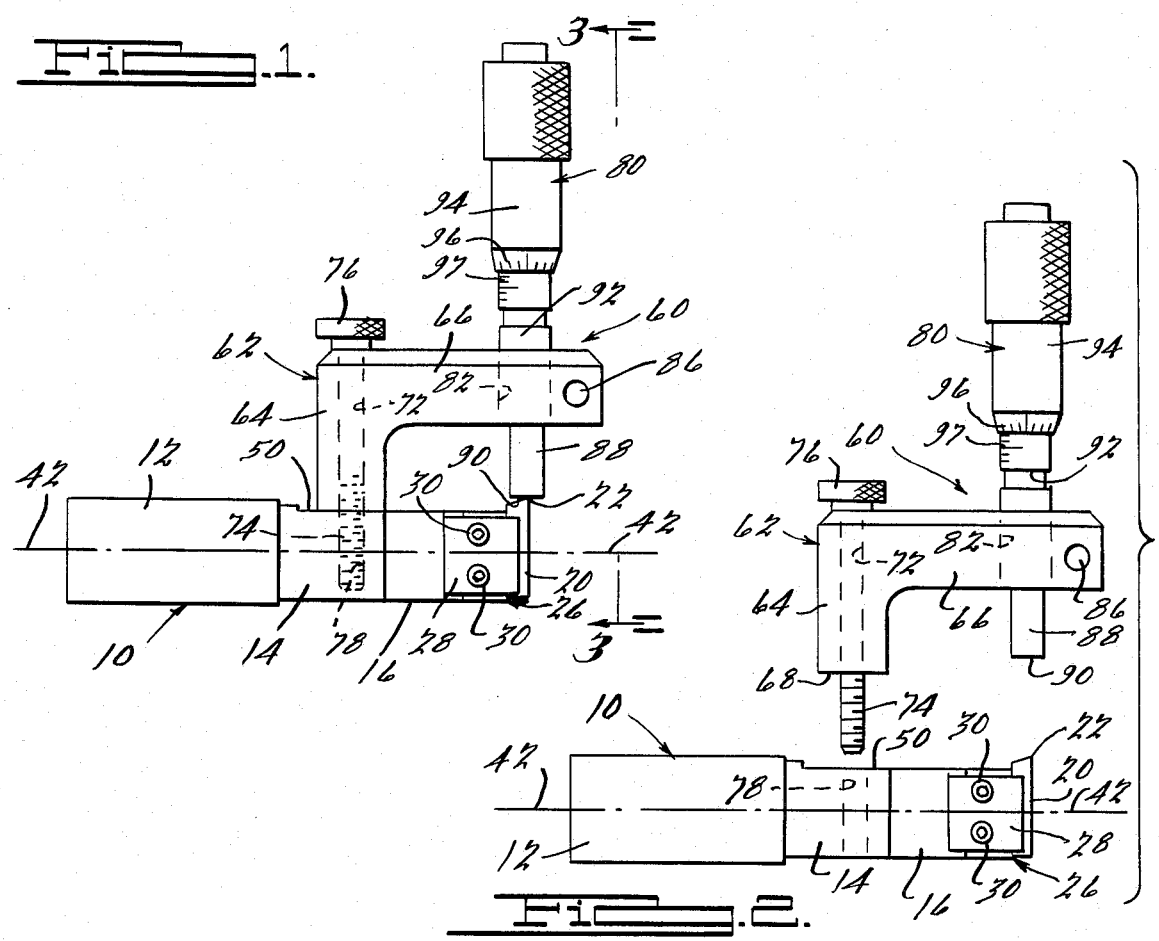
Fig. 1.
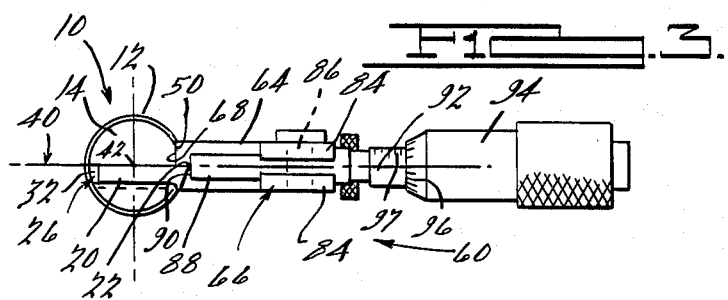
Fig. 2.
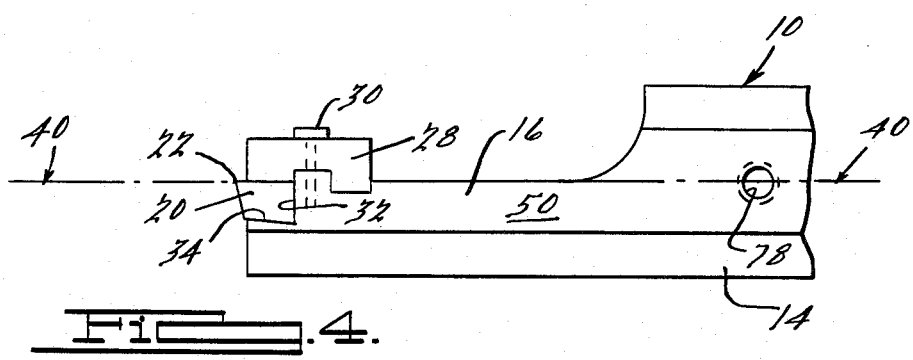
Fig. 3.
Fig. 4.

BORING BAR AND MEASURING DEVICE THEREFOR

This application is a continuation of application Ser. No. 469,293, filed Feb. 24, 1983, abandoned.

BACKGROUND AND SUMMARY OF THE INVENTION

The invention relates generally to boring bars and associated measuring gages for accurately positioning a cutting tool on the boring bar. In particular, the invention relates to such a boring bar having a measuring gage attachable thereto.

Various devices have been proposed for use in accurately positioning a cutting tool on a boring bar in order to machine an accurate hole or bore in a workpiece. Some of such devices have necessitated the boring of a trial bore and measuring the size of the bore in order to determine whether the cutting tool is correctly positioned on the boring bar or whether further adjustment is required. Such devices have proved to be cumbersome, time-consuming and wasteful of materials since the position of the cutting tool could not be accurately determined prior to installation of the boring bar assembly on the boring machine.

Various other devices have been proposed for presetting of the cutting tool prior to installing the boring bar on the boring machine or thereafter. Many of such devices have included either generally V-shaped or Y-shaped structures engagable with a cylindrical portion of the boring bar and adapted to support a measuring device during measurement and presetting of the cutting tool. Other of such devices require a special gaging surface on the cutting tool, thereby precluding the use of standard cutting tools which are so commonly used in the machine industry. Such prior devices have typically proved to be inaccurate, difficult to use, time-consuming and inordinately expensive.

It is therefore one of the objects of the present invention to provide a measuring gage device for presetting the radial position of the cutting tip of a cutting tool relative to the rotational center line of a boring bar without introducing the inaccuracies or complications of the prior devices and without requiring a special gaging surface on each individual cutting tool. As used herein, the term "radial" refers to a direction or a position along an imaginary line extending from the rotational center line of the boring bar toward or through its periphery.

In accordance with the present invention, an improved measuring gage device is provided for a boring bar having a cutting tool releasably secured to the boring bar for rotation therewith. The cutting tool is secured to the boring bar so that its cutting tip lies in a reference plane which contains, and is defined by, the cutting tip and the rotational center line of the boring bar. The boring bar includes a gaging surface precisely machined thereon and a measuring gage device engageable with the gaging surface on the boring bar for accurately measuring the radial position of the cutting tip relative to the boring bar's rotational center line. The measuring gage device includes a member having a generally planar measuring surface which is moveable into and out of abutment with the cutting tip to determine its radial position. The measuring device also includes a gaging surface which corresponds to the gaging surface on the boring bar and is mutually engageable therewith in order to substantially assure that the plane of the measuring surface is perpendicular to the reference plane, which is defined by the cutting tip and the boring bar's rotational center line. Preferably, the measuring gage device includes attachment apparatus for releasably fixing the measuring device to the boring bar. Such attachment substantially assures that the gaging surfaces of the measuring gage device and the boring bar are properly engaged in order to maintain the proper alignment of the measuring gage device with the boring bar. The measuring gage device according to the present invention thus accomplishes a high degree of accuracy in the radial positioning of the cutting tip by gaging relative to a planar surface on the boring bar itself which is fixed in spatial relation to the rotational center line thereof of the boring bar, thereby effectively gaging said radial position directly from the center line itself.

Additional advantages and features of the present invention will become apparent from the following description and the appended claims, taken in conjunction with the accompanying drawings.

BRIEF DESCRIPTION OF THE DRAWINGS

FIG. 1 is an elevational view of a boring bar and its associated measuring gage, in accordance with the present invention, wherein the measuring gate is attached to the boring bar.

FIG. 2 is an elevational view similar to that of FIG. 1, but with the measuring gage removed from the boring bar.

FIG. 3 is an end view of the boring bar and associated measuring gage of the present invention, taken along line 3—3 of FIG. 1, but with the cutting tool retaining member removed for clarity.

FIG. 4 is an enlarged view of a portion of the boring bar, taken along line 4—4 of FIG. 1.

DETAILED DESCRIPTION OF THE PREFERRED EMBODIMENTS

FIGS. 1 through 3 of the drawings depict an exemplary embodiment of a boring bar and associated measuring device according to the present invention. One skilled in the art will readily recognize, however, that the principles of the present invention are equally applicable to devices other than boring bars as well as being applicable to boring bars and associated measuring gages other than those shown in the drawings.

Referring to the drawings, a boring bar 10 generally includes a shank portion 12 sized and adapted to be clamped or otherwise secured in a boring machine or lathe, a body portion 14 that is sized to correspond with the minimum or nominal size of the boring bar, and a tool-holding portion 16. Examples of such nominal sizes include 0.50 inch, 0.75 inch, 1.00 inch and 1.50 inch, which may be larger or smaller than the shank portion 12. A conventional cutting tool 20, having a hardened cutting tip or point 22 thereon, is releasably secured within a conventional recess 26 extending in a generally lateral direction across the tool-holding portion 16. The cutting tool 20 is releasably secured within the recess 26 by a retaining member 28 and one or more retaining fasteners 30, depending to a large extent upon the size of the boring bar. The recess 26 is defined by a pair of surfaces 32 and 34 that intersect at an acute angle, thereby cooperating with the retaining member 28 to hold the cutting tool in place. Preferably, the intersection of such surfaces 32 and 34 is parallel to a reference plane 40 that contains, or is defined by, the point of the cutting tip 22 and the rotational center line 42 of the boring bar 10. The radial position of the cutting tip 22 relative to the rotational center line 42 of the boring bar 10 may be selectively adjusted or altered by loosening the retaining fasteners 30 to allow the cutting tool 20 to be moved radially or laterally with respect to the recess 26 and the retaining member 28. The retaining fasteners 30 are then tightened to secure the cutting tool in the desired position.

The tool-holding portion 16, the recess 26, and the cutting tool 20 are configured and positioned on the boring bar so that the cutting tip 22 lies within the horizontal reference plane 40 which contains, or is defined by, the cutting tip 22 and the rotational center line 42 of the boring bar 10. Thus when the cutting tip 22 is accurately positioned at a predetermined desired dimension from the rotational center line 42, the boring bar assembly may be used in machining a hole or bore in a workpiece, with the hole or bore having a radius equal to the dimension between the cutting tip 22 and the rotational center line 42.

The preferred boring bar 10 includes a flat planar gaging surface 50 accurately positioned at a predetermined dimension from the rotational center line 42. The gaging surface 50 is precisely machined to be perpendicular to the horizontal reference plane 40 and positioned on the boring bar so that a radius extending outwardly from the rotational center line 42 through the cutting tip 22 intersects a plane containing the planar gaging surface 50.

A measuring gage device 60 preferably includes an L-shaped frame member 62, which is foremd by a laterally-extending leg 64 and a longitudinally-extending leg 66. A flat planar gaging surface 68 is precision-machined on the free end of the laterally-extending leg 64 and is adapted for flush, mutually-abutting engagement with the gaging surface 50 on the boring bar 10. The laterally-extending leg 64 also preferably includes a bore 72 extending therethrough in a generally lateral direction. A threaded screw or fastener 74 is received within the bore 72 and includes a head portion 76 for engaging the frame member. A corresponding threaded bore 78 extends from the gaging surface 50 in a generally radially inward direction into the boring bar 10. The threaded screw 74 protrudes laterally from the laterally-extending leg 64 to threadably engage the threaded bore 78 in order to releasably attach the frame member 62 to the boring bar, in a fixed relationship therewith, with the gaging surfaces 50 and 68 in the above-mentioned flush, mutually-abutting relationship.

In the preferred embodiment, the measuring gage 60 includes a conventional micrometer device 80 connected and secured to the longitudinally-extending leg 66 in a spaced relationship from the laterally-extending leg 64. One skilled in the art will recognize that other appropriate measuring devices may be used. The micrometer device 80 includes a movable spindle, or measuring member, 88 having a flat planar measuring surface 90 on its free lateral end. A sleeve portion 92 of the micrometer device 80 is received within a bore 82 extending through split portions 84 of the frame member 62 and is secured therein. A threaded fastener 86 is adapted to be tightened in order to draw the split portion 84 together in secure engagement with the sleeve portion 92.

The spindle or measuring member 88 is laterally moveable, relative to the sleeve portion 92 and the frame member 62, in response to rotation of a thimble portion 94 which surrounds the sleeve portion 92. Such movement of the measuring member 88 allows the measuring surface 90 to be moved into abutment with the cutting tip 22 during measuring, gaging or tool positioning operations with the measuring surface 90 remaining parallel to a plane containing the frame member's planar gaging surface 68, regardless of the position or movement of the measuring member. Therefore, since the gaging surface 50 is precision-machined on the boring bar 10 such that it is perpendicular to the horizontal reference plane 40, the planar measuring surface 90 remains perpendicular to the horizontal reference plane 40 when the measuring gage 60 is secured to the boring bar 10, regardless of the position or movement of the measuring member 88. Such precision alignment of the measuring surface 90 relative to the horizontal reference plane 40 and the rotational center line 42 subtantially assures accurate positioning and gaging of the radial position of the cutting tip 22 relative to the rotational center line 42. Such accurate positioning of the cutting tip 22 thereby substantially assures accurate machining of holes or bores in a workpiece.

It should be noted that the measuring member 88 preferably has a hardended tip on its free end, such as carbide, for example, so that the measuring surface 90 is a hardened surface to substantially avoid or minimize damage thereto resulting from repeated contact or abutment with the tool-hardened cutting tip 22, which may also be carbide or other hardened materials. If not avoided, such damage would cause inaccuracies in the measuring, gaging, and positioning of the position of the cutting tip.

Preferably, the micrometer device 80 includes indicating marks 96 on the thimble portion 94 which correspond to, and are alignable with, conventional indicating marks 97 on the sleeve portion 92 to aid in the accurate measurement of the position of the measuring surface 90 as the thimble portion 94 is rotated. In one preferred embodiment of the present invention, the measuring gage 60 and its micrometer device 80 are sized, configured and calibrated such that the indicating marks 96 and 97 indicate a "zero reading" when the position of the measuring surface 90 corresponds to the minimum or nominal size bore for which the boring bar 10 may be used. It should be noted that such a measuring gage may be used in conjunction with any of a number of different sizes of boring bars 10 which have a gaging surface 50 machined thereon as described above. Therefore, only a single measuring gage 60 is required for a plurality of boring operations using boring bars of various sizes.

It should be notd that by virtue of the configuration and construction of the boring bar 10 and the measuring gage 60, described above, the gaging surface 50, the gaging surface 68, and the measuring surface 90 are all parallel to one another and are all perpendicular to the horizontal reference plane 40. Thus, accurate measurements of the radial position of the cutting tip 22 may be obtained so long as the frame member 62 is secured to the boring bar 10 with the measuring member positioned so that the measuring surface 90 may be moved into abutment with the cutting tip 22. It should also be noted that the shape and configuration of the various components of the measuring gage assembly 60, as described and shown herein, are merely an exemplary preferred embodiment. Other shapes and configurations may alternatively be employed, using the principles of the invention, to derive the various features discussed above. For example, even the gaging surfaces 50 and 68 may be modified to be non-planar and/or to be oriented other than as described above so long as such modified gaging surfaces correspond to one another so that the measuring surface 90 remains perpendicular to the reference plane 40 in order to substantially assure accurately measuring, gaging or positioning of the cutting tip 22.

The foregoing discussion discloses and describes exemplary embodiments of the present invention. One skilled in the art will readily recognize from such discussion that various changes, modifications and variations may be made therein without departing from the spirit and scope of the invention as defined in the following claims.

I claim:

1. A boring bar assembly comprising in combination:

a rotatable boring bar having a planar and flat bar gaging surface formed integrally on the external periphery of said rotatable boring bar and rotatable therewith, and a cutting tool releasably secured thereto for rotation therewith, said cutting tool having a cutting tip thereon lying in a reference plane defined by said cutting tip and the rotational center line of said boring bar, said flat bar gaging surface being integrally and fixedly oriented in a substantially perpendicular relationship with said reference plane;

adjustment means for selectively presetting and for movably altering the radial position of said cutting tip relative to said rotational center line;

measuring means for measuring said radial position of said cutting tip, said measuring means including a frame member having a single planar flat frame member gaging surface thereon and a measuring member having a generally flat and planar measuring surface thereon, said flat and planar measuring surface being abuttable with said cutting tip in order to measure said radial position thereof, said measuring member being connected to said frame member for movement relative thereto in a direction such that said flat measuring surface is substantially parallel to a plane containing said flat frame member gaging surface regardless of the position or movement of said measuring member relative to said frame member;

attachment means for releasably fixing said frame member to said boring bar such that said flat bar gaging surface and said flat frame member gaging surface are in a generally flush and flat mutual engagement with one another, said flat bar gaging surface and said flat frame gaging surfaces being located and oriented relative to said boring bar, to said cutting tip, and to said reference plane such that said generally flat and planar measuring surface is subtantially perpendicular to said reference plane when said flat bar gaging surface and said flat frame gaging surface are in said flush and flat mutual engagement regardless of the position or movement of said measuring member relative to said frame member and regardless of the rotational position of said boring bar, said radial position of said cutting tip thereby being accurately presettable and adjustable to a desired radial position relative to said rotational center line by positioning said measuring surface at said desired radial position and moving said cutting tip to abut said measuring surface regardless of the rotational position of said boring bar, said attachment means further establishing the longitudinal positioning of said measuring means with respect to the said axis of rotation of said boring bar whereby said measuring means will be positioned at a given longitudinal position each time said measuring means is fixed to said boring bar;

said frame member of said measuring means being of a one-piece generally L-shaped configuration having first and second integral legs generally perpendicular to each other, said first leg extending in a lateral direction perpendicular to the rotational center line of the boring bar and said second leg extending in a longitudinal direction parallel to the rotational center line of the boring bar when said frame member is releasably fixed to said boring bar, said flat frame member gaging surface extending longitudinally on a laterally inward end of said laterally-extending first leg and said movable measuring member being connected to said longitudinally-extending second leg for movement in a lateral direction relative thereto; and said attachment means including a first threaded opening extending in an inward radial direction from said flat bar gaging surface, a second opening extending in a lateral direction through said laterally-extending first leg of said frame member, and a threaded screw received in said second opening and protruding laterally from said flat frame member gaging surface, said threaded screw being threadably receivable in said first threaded opening in said boring bar in order to removably fix said frame member to said boring bar with said flat bar gaging surface and said flat frame member gaging surface in said flat and flush mutual engagement.

2. A boring bar assembly according to claim 1, wherein said measuring member includes a carbide tip thereon, said measuring surface thereby comprising a carbide surface.

3. A boring bar assembly according to claim 1, wherein said measuring means is adapted to be used in conjunction with a plurality of boring bars having various sizes.

4. A boring bar assembly according to claim 1, wherein said measuring means further comprises indicating means for indicating the position of said flat measuring surface relative to said frame member, said indicating means thereby providing indication of the radial position of said cutting tip when said frame member is fixed to said boring bar by said attachment means and said flat measuring surface is abutting said cutting tip.

5. A boring bar assembly according to claim 4, wherein said indicating means and said movable measuring member comprise a micrometer device connected to said frame member.

6. A boring bar assembly according to claim 5, wherein said measuring means is calibrated such that said indicator means indicates the increased radial position of said cutting tip over the radius of a minimum size hole that said boring bar may be used in machining said hole in a workpiece.

7. A boring bar assembly according to claim 6, wherein said measuring means is adapted to be used in conjunction with a plurality of boring bars having various sizes.

8. A boring bar assembly according to claim 7, wherein said indicating means and said movable measuring member comprise a micrometer device connected to said frame member.

9. A boring bar assembly according to claim 7, wherein said measuring member includes a carbide tip thereon, said measuring surface thereby comprising a carbide surface.

* * * * *